Nov. 21, 1967   D. E. ROBERTS   3,353,796
VIBRATORY BURNISHING SYSTEM WITH METERED FEED
Filed May 17, 1965   2 Sheets-Sheet 1

Inventor
Donald E. Roberts
By: Olson, Tresler, Wolters & Bushnell attys

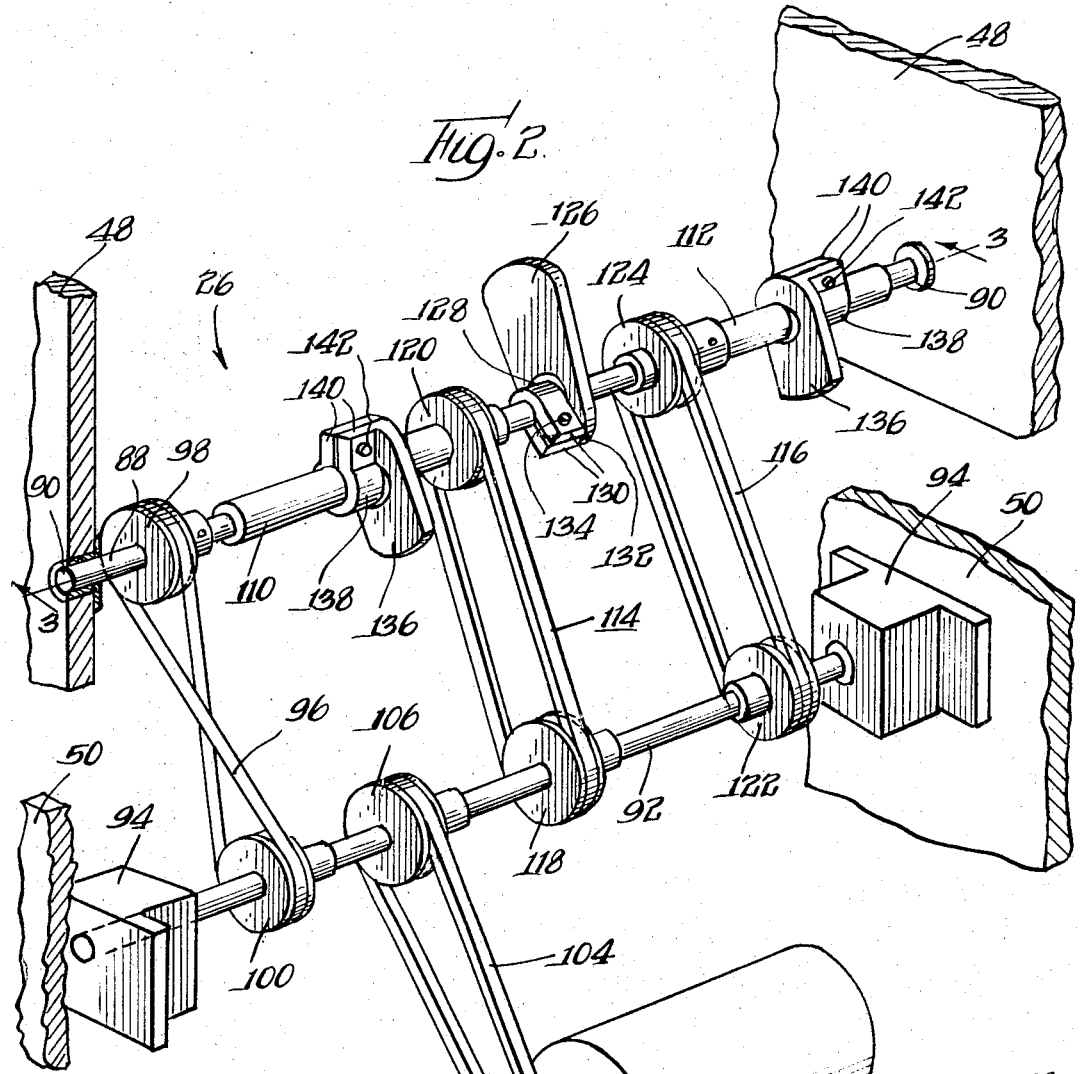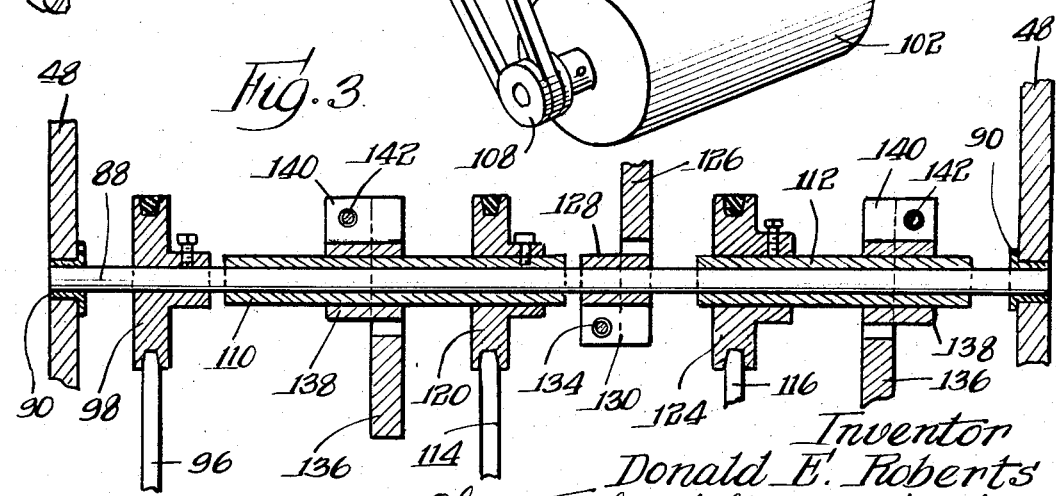

United States Patent Office 3,353,796
Patented Nov. 21, 1967

3,353,796
VIBRATORY BURNISHING SYSTEM
WITH METERED FEED
Donald E. Roberts, 141 Rice Ave.,
Bellwood, Ill. 60104
Filed May 17, 1965, Ser. No. 456,185
9 Claims. (Cl. 259—2)

ABSTRACT OF THE DISCLOSURE

Vibratory burnishing apparatus including a first liquid handling arrangement delivering a continuous flow of liquid into a work vessel and a second liquid handling arrangement coordinated with the first liquid handling arrangement so as to preserve and continuously renew a preselected level of liquid in the work tube along with the particulate burnishing medium. An arrangement of spindle and quill shafts and eccentric weights is employed as the vibratory drive, and means are provided for simultaneously adjusting the respective flow regulating units of the fluid handling arrangements.

---

This invention relates generally to vibratory burnishing machines and more particularly to vibratory burnishing machines that are arranged to utilize a liquid as one component of the working medium.

In the burnishing and cleaning or re-useable articles such as sliverware, surfactants and water are frequently added to the main charge of stainless steel beads in the work tube of the machine to improve and accelerate the action of the beads. However, substantially continuous operations are beset with the problem of removed materials accumulating as each run progresses and the concomitant difficulties of bead contamination, bead corrosion and reduced burnishing effectiveness. On the other hand, systems planned for alternate periods of operation and clean-up are, by their very nature, inefficient of both machine and labor.

Hence, an important object of the present invention is to provide a vibratory burnishing system that is characterized by a regulated throughput of adjunct liquid.

A more general object of the invention is to provide a new and improved vibratory burnishing system.

Another broad object of the invention is to provide a vibratory burnishing system that is arranged for continuous operation at peak cleaning efficiency.

Still another object of the invention is to provide a vibratory burnishing system that is easy and economical to operate.

And still another object of the invention is to provide a vibratory burnishing apparatus with a metered input and output of adjunct liquid.

A further object of the invention is to provide a liquid flow system for a vibratory burnishing machine which accurately controls the amount of liquid in the machine.

And a yet further object of the invention is to provide a liquid flow system for a vibratory burnishing machine which insures proper proportioning of diverse liquids being fed to the machine.

These and other objects and features of the invention will become more apparent from a consideration of the following descriptions.

In order that the principles of the invention may be readily understood, a single embodiment thereof, but to which the application is not to be restricted, is shown in the accompanying drawings wherein:

FIG. 2 is an enlarged perspective view of the vibratory mechanism employed in the system of FIG. 1; and FIG. 3 is an enlarged, cross-sectional view taken substantially along the line 3—3 of FIG. 2.

Figure 1:
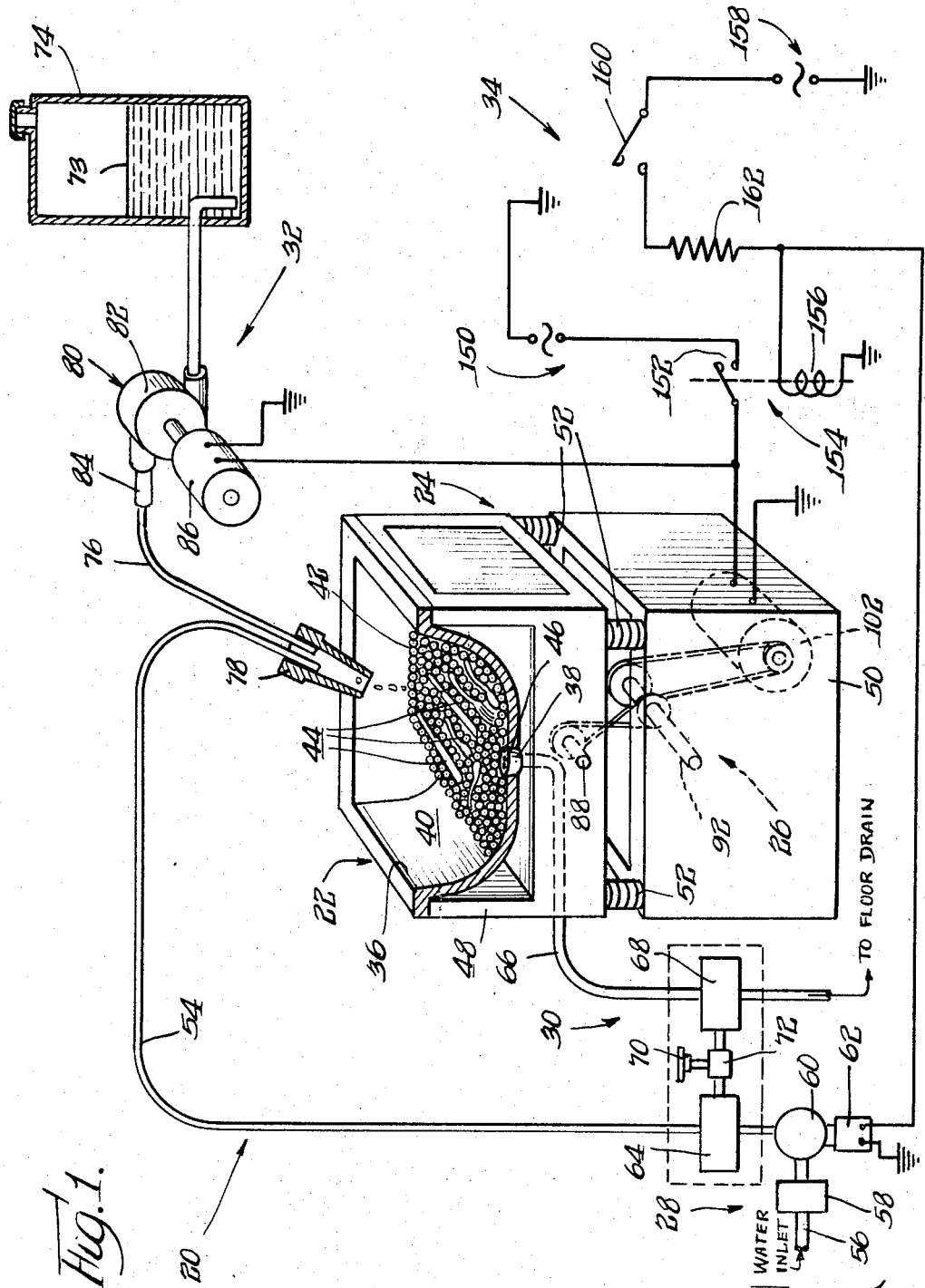
FIG. 1 is a schematic of a vibratory burnishing system constructed in compliance with the present invention.

Referring now in detail to the drawing, specifically to FIG. 1, a vibratory burnishing system indicated generally by the numeral 20 comprises a work tub 22, a mounting framework 24 for the work tub 22, a vibration inducing unit 26, three liquid handling units indicated respectively by the reference numerals 28, 30 and 32, and a control unit 34.

The work tub 22 defines a vessel having an open top 36 and a bottom drain hole 38, the tub being advantageously provided with a corrosion resistant rubber lining 40. The tub 22 is thus adapted to receive a charge of stainless steel burnishing balls or beads 42 and a charge of workpieces 44 such as silverware. To retain the burnishing balls and the workpieces, the drain hole 38 is covered with a screen 46 having appropriately sized perforations.

The mounting framework 24 supports the work tub 22 for vibration and specifically includes an upper frame 48 to which the tub is secured and a lower frame 50 which rests on the floor or other like surface. In order to accommodate vibration of the work tub 22, the upper frame 48 is resiliently mounted to the lower frame 50, specifically by means of compression springs 52 disposed at appropriate intervals about the margins of the stacked frames 48 and 50.

The liquid handling units 28, 30 and 32 are arranged both to provide a constant supply of water and cleaning composition to the work tub 22 and to insure that the proper amount of liquid and the proper proportions of water and cleaning compound are added. Structurally, the liquid handling unit 28 includes a delivery conduit 54 which is directed to empty into the open top 36 of work tub 22. This delivery conduit is connected to means for passing a flow of fresh water under pressure, specifically a source pipe 56. The flow of water entering the delivery conduit 54 is modulated to some substantially constant pressure such as 10 p.s.i.g. for example by a regulator 58, and this flow is initiated and terminated by means of a normally closed shut-off valve 60 which is operated by a solenoid 62. In addition to the delivery conduit 54 and the source pipe 56, the liquid handling unit 28 includes an adjustable, flow regulating needle valve 64 which is disposed in fluid circuit between the delivery conduit and the source pipe.

Cooperatively, the liquid handling unit 30 includes a drain conduit 66 which is directed to open into the drain hole 38 of work tub 22, the liquid handling unit 30 additionally comprising an adjustable, flow regulating needle valve 68 that is disposed in series fluid circuit with the drain conduit 66 at a position gravitationally beneath the work tub 22. The needle valves 64 and 68 share a common manual operator element 70 which simultaneously adjusts the relative orifice size of each of the needle valves. The operator 70 is particularly arranged relatively to open and close the needle valves 64 and 68 so as to maintain a selected proportional flow through the conduits 54 and 66; and for this purpose, the operator 70 is connected to the valve elements of needle valves 64 and 68 by means of a suitable gear train 72.

Whereas the liquid handling unit 28 delivers fresh water to the work tub 22, the liquid handling unit 32 delivers a flow of liquid cleaning material 73 from a reservoir 74 to the work tub 22. The liquid handling unit 32 comprises a delivery conduit 76 which is directed to open into the top 36 of the work tub; and conveniently, the two delivery conduits 54 and 76 empty through a common nozzle 78. It is recognized that a mixing T could be substituted for the nozzle 78. In addition to the delivery conduit 76, the liquid handling unit 32 includes a metering pump arrangement 80 which is made up of a pump 82, a fixed orifice unit 84 and an electric drive motor 86 which is mechanically coupled to the pump 82. Relatively small amounts of the concentrated liquid material from reservoir 74 are added to the work tub with the water from liquid handling unit 28. For example, a flow of the cleaning liquid of about five fluid ounces per hour may be usefully combined with a flow of fresh water of about four gallons per hour. With such low flow rates of cleaning liquid, the metering pump arrangement 80 is particularly advantageous, although it is recognized that, with a less concentrated solution in the reservoir 74 and therefore more nearly equal rates through the delivery conduits 54 and 76, other means for passing a flow under pressure could be employed in conjunction with a flow regulating valve. For example, a pressure head from a standpipe might be used in conjunction with a metering valve. It is also to be recognized that the fixed orifice 84 could be replaced by a variable orifice unit.

The substantially constant pressure supplied by the pump 82 delivers a substantially constant flow from the fixed orifice 84 to the delivery conduit 76, and this flow may be used as a datum from which to adjust the flow through delivery conduit 54 and drain conduit 66 through the regulation of needle valves 64 and 68. The needle valve 68 in the exit line may be sized to accommodate the datum flow established by orifice 84 as an additive flow to that established by needle valve 64; or alternatively, the flow from liquid handling unit 32 may be substantially ignored because of its small magnitude, and the needle valves 64 and 68 therefore designed to be of substantially identical size and rate of size change.

Turning now to a consideration of FIGS. 2 and 3 for a description of the vibration inducing unit 26, a spindle shaft 88 will be seen mounted between opposite sidewalls of the upper frame 48 in journals 90. A pulley shaft 92 is mounted between opposite sidewalls of lower frame 50 parallel to the spindle shaft 88 by means of journal blocks 94; and power is transmitted from the pulley shaft to the spindle shaft by means of a belt 96 that drivingly couples a pair of pulleys 98 and 100, pulleys 98 and 100 being affixed respectively to the spindle shaft and the pulley shaft. Rotative energy is applied to the pulley shaft 92 from an electrically energized motor 102 through a belt 104 that interconnects a pair of appropriately sized pulleys 106 and 108, pulleys 106 and 108 being fastened respectively to the pulley shaft 92 and to the output shaft of motor 102.

A pair of axially spaced quill shafts 110 and 112 are telescoped over the spindle shaft 88 to be counterrotatable therewith, and rotative force is transmitted from the pulley shaft to the quill shafts 110 and 112 by means of drive belts 114 and 116 respectively. Belt 114 drivingly couples a pulley 118 that is secured to shaft 92 and a pulley 120 which is fastened to quill shaft 110. Similarly, belt 116 drivingly interconnects a pulley 122 that is mounted on shaft 92 and a pulley 124 fastened to quill shaft 112. Counterrotation of the spindle shaft and quill shafts is readily achieved by crossing drive belt 96 as is shown in FIG. 2.

In order to induce the desired pattern of vibration in the work tub 22, eccentric weights are mounted on the spindle shaft 88 and the quill shafts 110 and 112. Specifically, an eccentric weight member 126 is adjustably secured on spindle shaft 88. The weight member 126 includes a collar element 128 having aligned radial flanges 130. In order that the collar element may grip the spindle shaft 88, the heel of member 126 is split with a slot 132 that is aligned generally with the edges of the confronting faces of flanges 130. The resiliency thus afforded the collar 128 permits a threaded fastener 134 to draw the flanges 130 tightly together so that the collar 128 clamps onto the spindle shaft 88. Similarly, eccentric weights 136 are adjustably mounted on the quill shafts 110 and 112. The eccentric weight members 136 have split heels and include collars 138 with flanges 140 similar to the construction and arrangement of weight member 126 whereby to permit a threaded fastener 142 to clamp the weight members 136 on the respective quill shafts.

The eccentric weight members 136 differ from the eccentric weight member 126 in having individual masses which are approximately half the mass of the weight member 126. The eccentric masses thus imposed on the cooperating spindle and quill shafts may thus be balanced radially. The eccentric weight members 126 and 136 are adjustably positionable axially by means of the respective collars and the cooperating flanges in order that the pattern of vibration induced in the work tub may be varied as by shifting the weight members 136 both axially and angularly with respect to a given position of the weight member 126. Various types and patterns of vibration may be induced in the work tub in this manner.

Returning to FIG. 1 for a description of the control unit 34, the drive motors 102 and 86 of the vibration inducing unit 26 and the metering pump arrangement 80 respectively are shown connected in parallel electrical circuit to be energized from an alternating current source 150 through contacts 152 of a relay 154. The source 150 may be considered to be a three-phase source if desired. The relay 154 includes a coil 156 which is connected in parallel circuit with solenoid 62 and which is energized from an alternating current source 158 through the contacts of a manual switch 160 and a load resistor 162. The described electrical circuitry connects the drive motors 102 and 86 and the operating solenoid 62 of shut-off valve 60 for energization in unison, additionally providing switch means for controlling the described circuit. Use of the relay 154 as an isolating relay is of particular advantage when source 150 is of considerably greater voltage than source 158.

In operation of the vibratory burnishing system 20, a charge of the burnishing balls 42 is first filled into the work tub 22 and then the manual switch 160 is closed energizing the drive motors 102 and 86 and actuating solenoid 62 to open valve 60. Energization of motor 102 causes counterrotation of the spindle shaft 88 and the quill shafts 110 and 112, the corresponding motion of eccentric weight members 126 and 136 inducing vibration in the work tub and thereby the charged burnishing balls 42. Energization of motor 86 drives the pump 82 to meter a selected flow of the cleaning liquid from reservoir 74, through the fixed orifice 84 and into the delivery conduit 76. Opening valve 60 serves to pass a selected flow of fresh water from the source pipe 56 through the needle valve 64 and to the delivery conduit 54. As the cleaning liquid material from the reservoir 74 mixes with the water from delivery conduit 54 in the nozzle 78, the resultant stream enters the work tub to mix with the burnishing balls 42, wetting the same and filling the lower portion of the work tub and the drain conduit 66. As gravity head develops between the work tub and the needle valve 68, liquid begins to flow through the latter needle valve and out of work tub. If desired, regulation of this flow may be achieved by means of the operator 70.

With the work tub 22 and its contents vibrating and with the desired flow of liquids established, workpieces, such as the illustrated workpieces 44 comprising silverware items, will be introduced into the work tub for temporary residence therein so as to be burnished. The workpieces are removed as the desired degree of polish is achieved in order to make room for other workpieces.

Because the liquid handling units 28, 30 and 32 are coordinated in their respective delivery and draining actions, excessive liquid never builds up in the work tub to damp the vibratory action and cause undesirable splattering. Furthermore, foreign matter and contaminants removed from the workpieces exit from the work tub with the spent cleaning liquid through the drain conduit 66. Accordingly, the burnishing balls 42 are maintained in a clean and peak burnishing condition at all times.

Moreover, there is no need to stop the burnishing system for clean-up, and the system may be operated in a substantially continuous fashion. As a result, the system 20 is especially efficient in that there is no labor involved in clean-up and in that there is no machine time lost in such operations.

Therefore, the specific example herein shown and described is to be considered as being primarily illustrative. Various changes in structure will, no doubt, occur to those skilled in the art; and such changes are to be understood as forming a part of this invention insofar as they fall within the spirit and scope of the appended claims.

The invention is claimed as follows:

1. In a vibratory burnishing system, the combination comprising: first liquid handling means, including a delivery member adapted to direct flow into a vibratory work tub, means for passing a flow under pressure, and first flow regulating means disposed in fluid circuit between said delivery member and said last mentioned means; second liquid handling means, including a drain member adapted to receive a flow from the vibratory work tub and second flow regulating means in said drain member; and means for simultaneously adjusting said first and second flow regulating means.

2. In a vibratory burnishing system, the combination comprising: first liquid handling means, including a delivery member adapted to direct flow into a vibratory work tub, means for passing a flow under pressure, and first flow regulating means disposed in fluid circuit between said delivery member and said last mentioned means; second liquid handling means, including a drain member adapted to receive flow from the vibratory work tub and second flow regulating means in said drain member; third liquid handling means, including a second delivery member adapted to direct flow into the vibratory work tub, pumping means for passing a flow under pressure, third flow regulating means disposed in fluid circuit between said second delivery member and said pumping means, and a drive motor for said pumping means; valve means connected in series fluid circuit with said first flow regulating means, including a valve operating member; and control means, including circuit means connecting said drive motor and said valve operating means for energization in unison and further including switch means for controlling said circuit means.

3. In a vibratory burnishing system, the combination comprising: a work tub having top and bottom apertures; first liquid handling means including a delivery member directed to open into the top aperture of said work tub, means for passing a flow under pressure and first flow regulating means disposed in fluid circuit between said delivery member and said last mentioned means; second liquid handling means, including a drain member directed to open into the bottom aperture of said work tub and second flow regulating means in said drain member gravitationally beneath said work tub; third liquid handling means, including a second delivery member directed to open into the top aperture of said work tub, pumping means for passing a flow under pressure, third flow regulating means disposed in fluid circuit between said second delivery member and said pumping means and a drive motor for said pumping means; valve means connected in series fluid circuit with said first flow regulating means and including valve operating means; and control means, including circuit means connected to said drive motor and said valve operating means for energization in unison and further including switch means for controlling said circuit means.

4. In a vibratory burnishing system, the combination comprising: a work tub having top and bottom apertures; means mounting said tub for vibration, including a tub frame; vibration inducing means coupled to said tub frame; first liquid handling means, including a delivery member directed to open into the top aperture of said work tub, means for passing a flow under pressure, and first flow regulating means disposed in fluid circuit between said delivery member and said last mentioned means; second liquid handling means, including a drain member directed to open into the bottom aperture of said work tub and second flow regulating means in said drain member; means for simultaneously adjusting said first and second flow regulating means; and third liquid handling means, including a second delivery member directed to open into the top aperture of said work tub, means for passing a flow under pressure and third flow regulating means disposed in fluid circuit between said second delivery member and said last mentioned means.

5. In a vibratory burnishing system, the combination comprising: a work tub having top and bottom apertures; means mountaing said tub for vibration, including a tub frame; vibration inducing means coupled to said tub frame and including a drive motor; first liquid handling means, including a delivery member directed to open into the top aperture of said work tub, means for passing a flow under pressure, and first flow regulating means disposed in fluid circuit between said delivery member and said last mentioned means; second liquid handling means, including a drain member directed to open into the bottom aperture of said work tub and second flow regulating means in said drain member; third liquid handling means, including a second delivery member directed to open into the top aperture of said work tub, pumping means for passing a flow under pressure, third flow regulating means disposed in fluid circuit between said second delivery member and said pumping means and a drive motor for said pumping means; valve means connected in series fluid circuit with said first flow regulating means and including valve operating means; and control means including circuit means connecting said drive motors and said valve operating means for energization in unison and further including switch means for controlling said circuit means.

6. In a vibratory burnishing system, the combination comprising: a work tub having top and bottom apertures; means mounting said tub for vibration, including a tub frame; vibration inducing means coupled to said tub frame, including a drive motor, a rotatable spindle shaft journaled to said tub frame, quill shaft means telescoped on said spindle shaft to be counterrotatable therewith, eccentric weight means fixed on said spindle shaft and on said quill shaft means and means drivingly coupling said motor to said shaft and to said shaft means; first liquid handling means, including a delivery member directed to open into the top aperture of said work tub, means for passing a flow under pressure, and first flow regulating means disposed in fluid circuit between said delivery member and said last mentioned means; and second liquid handling means, including a drain member directed to open into the bottom aperture of said work tub and second flow regulating means in said drain member; and means for simultaneously adjusting said first and second flow regulating means.

7. In a vibratory burnishing system, the combination comprising: a work tub having top and bottom apertures; means mounting said tub for vibration, including a tub frame; and vibration inducing means coupled to said tub frame, including a drive motor, a rotatable spindle shaft journaled to said tub frame, quill shaft means telescoped on said spindle shaft to be counterrotatable therewith, eccentric weight means fixed on said spindle shaft and on said quill shaft means and means drivingly coupling said motor to said shaft and to said shaft means.

8. Vibratory burnishing apparatus comprising: a vibratory work tub; particulate burnishing media in said tub; first liquid handling means, including a delivery member directing a flow of cleaning liquid into said tub, means for passing a continuous flow of liquid under pressure to said delivery member, and first flow regulating means of selected orifice size disposed in fluid circuit with said delivery member and said last mentioned means; whereby an accumulation of cleaning liquid is produced in said tub wetting said media and collecting soil material from said media; and second liquid handling means, including a drain member receiving a flow of soiled cleaning liquid from said tub and second flow regulating means in said drain member, said second regulating means having an orifice size selected to cooperate with the orifice of said first flow regulating means and with the liquid-accumulating propensity of said media in preserving a preselected level of accumulated liquid in said work tub and in continuously renewing the same.

9. Vibratory burnishing apparatus according to claim 8 wherein said delivery member includes a nozzle body having at least one end open to the atmosphere and wherein said apparatus further comprises third liquid handling means, including means for passing cleaning compound to said nozzle body separately from said means for passing liquid under pressure.

References Cited
UNITED STATES PATENTS

| | | | |
|---|---|---|---|
| 2,212,559 | 8/1940 | Ehret | 134—186 |
| 3,183,630 | 5/1965 | Wright | 259—72 X |
| 3,236,248 | 2/1966 | Ray | 134—58 |

WALTER A. SCHEEL, *Primary Examiner.*

J. M. BELL, *Assistant Examiner.*